Patented Jan. 17, 1928.

1,656,842

UNITED STATES PATENT OFFICE.

ROBERT STINSON, OF NORRISTOWN, PENNSYLVANIA.

PROCESS OF TREATING SPANISH MOSS.

No Drawing. Application filed June 10, 1924. Serial No. 719,138.

This invention relates to a novel process of treating Spanish moss, known botanically as *Tillandsia usteneoides*, and similar fibers.

One object of the process is to fix the tannic acid contained in the moss by the production of metallic tanate, with the result that the fiber will be strengthened and rendered more elastic.

The process also renders the fiber in better condition for further treatment, such as mercerizing or curling.

Another object of the invention is to render the husk of the fiber more brittle so that the same can be readily removed by the ordinary ginning or combing process.

With the above and other objects in view, the invention has particular relation to a novel process of treatment which is carried out as follows:—

The Spanish moss is submerged in a metallic salt solution, and allowed to remain therein until the tannic acid in the moss has become fixed. The moss is then removed from the solution and dried. The solution into which the moss is dipped may contain either ferrous chloride, ferric chloride, ferrous sulphate or ferric sulphate. The concentration of the solution is unimportant as with a weak solution, heat or longer duration of contact may be utilized to obtain the desired reaction.

In lieu of the metallic salt solution certain organic compounds in solution may be used to fix the tannic acid.

The husk of the moss is rendered brittle by said solution and readily drops off of the fiber in the process of ginning or combing. The fiber itself is strengthened and rendered more elastic by the process, and is thereby improved as a filler for mattresses, cushions and the like.

The strength and resiliency of the fiber may be increased by subjecting the same to the action of X-rays, ultra-violet rays, or an atmosphere of ozone.

What I claim is:—

The process of treating *Tillandsia usteneoides* consisting in submerging the same in a metallic salt solution and retaining the same in said solution until the tannic acid therein has become fixed, then removing the same from said solution and then drying the same, and removing the husk therefrom.

In testimony whereof I have signed my name to this specification.

ROBERT STINSON.